United States Patent [19]
McConnell

[11] 3,905,712
[45] Sept. 16, 1975

[54] SNAP LOCK FOR QUICKLY-DETACHABLE BEAM-TO-POST JOINT

[75] Inventor: Kennedy McConnell, Riverdale, Ill.

[73] Assignee: Interlake, Inc., Chicago, Ill.

[22] Filed: Sept. 27, 1973

[21] Appl. No.: 401,189

[52] U.S. Cl. ............... 403/317; 292/303; 211/176; 248/243
[51] Int. Cl.² ........................................... F16D 1/00
[58] Field of Search .......... 403/388, 316, 317, 318, 403/326, 329; 211/148, 176, 177; 248/220.5, 239, 243; 24/223 R, 224 R, 224 LS; 292/303

[56] References Cited
UNITED STATES PATENTS

| | | | |
|---|---|---|---|
| 3,271,059 | 9/1966 | Pearson | 24/224 R X |
| 3,273,720 | 9/1966 | Seiz | 248/243 X |
| 3,612,290 | 10/1971 | Evans | 211/176 |
| 3,702,137 | 11/1972 | Evans | 211/176 |

FOREIGN PATENTS OR APPLICATIONS 810,026  4/1969  Canada .............................. 211/176

Primary Examiner—Werner H. Schroeder
Assistant Examiner—Wayne L. Shedd
Attorney, Agent, or Firm—Prangley, Dithmar, Vogel, Sandler & Stotland

[57] ABSTRACT

A snap lock for interconnecting an upstanding post member and an associated horizontal beam member wherein a lock pin is loosely mounted in a resilient arm and is shiftable with respect thereto. The lock pin has a load bearing end which is fitted into aligned apertures in the associated members to interconnect the same. The lock pin is trapped in an oversized opening in the resilient arm by an enlargement on the end of a mounting stud.

15 Claims, 12 Drawing Figures

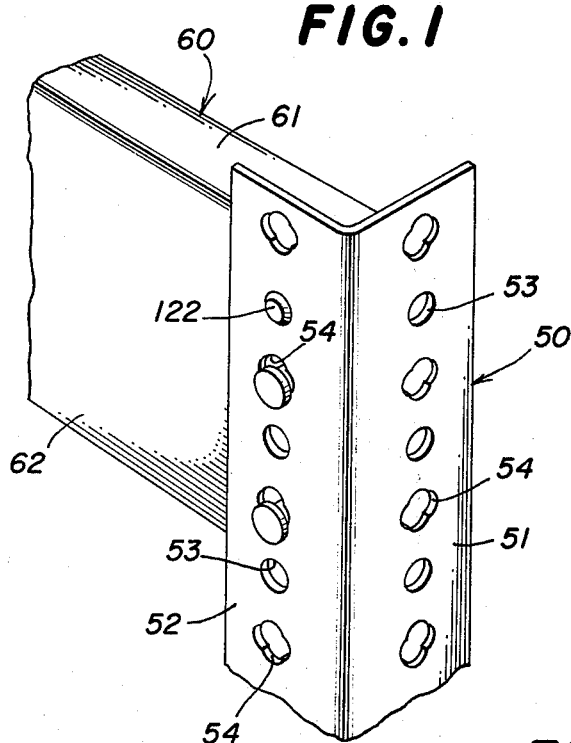
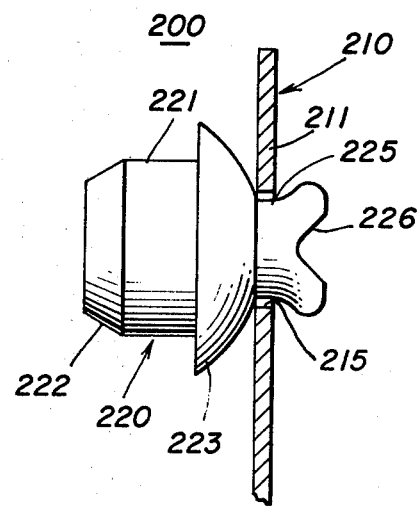
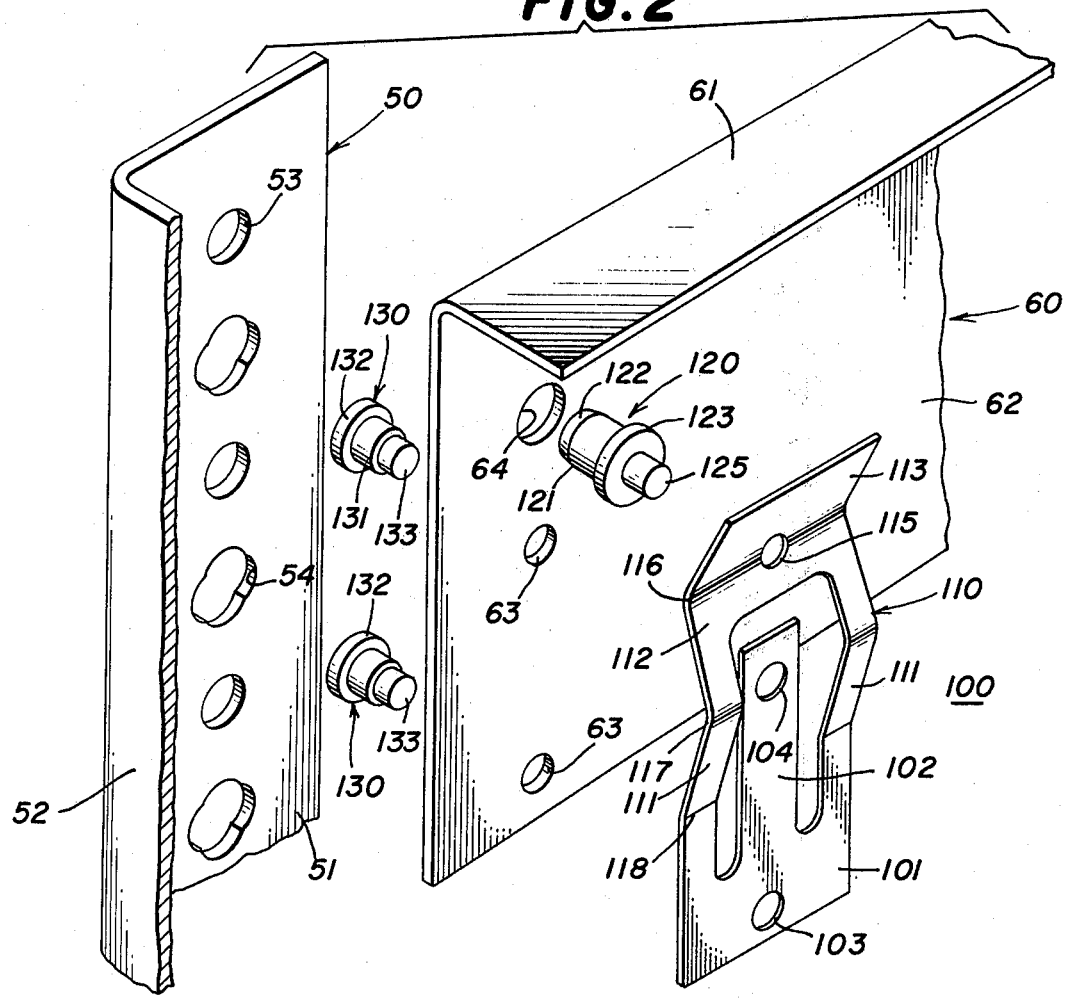

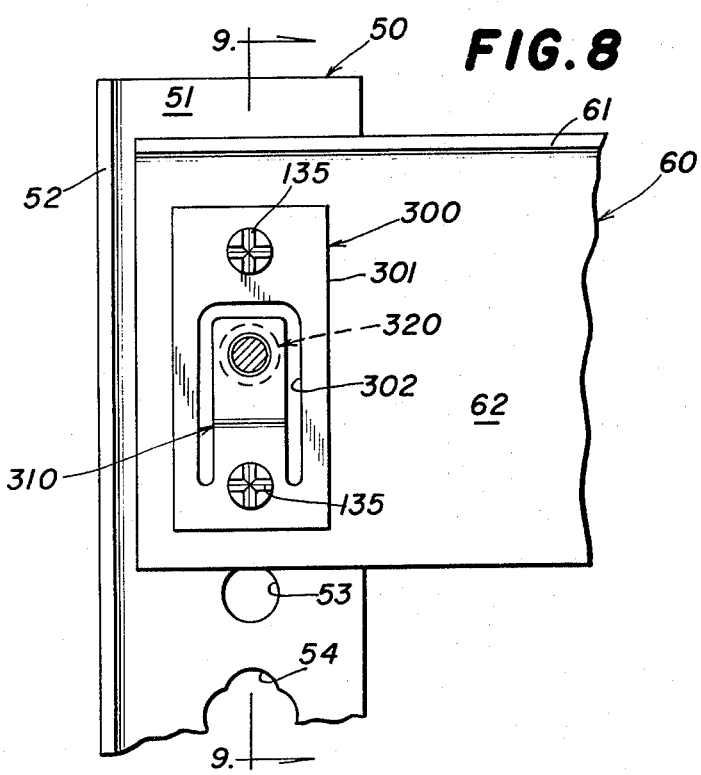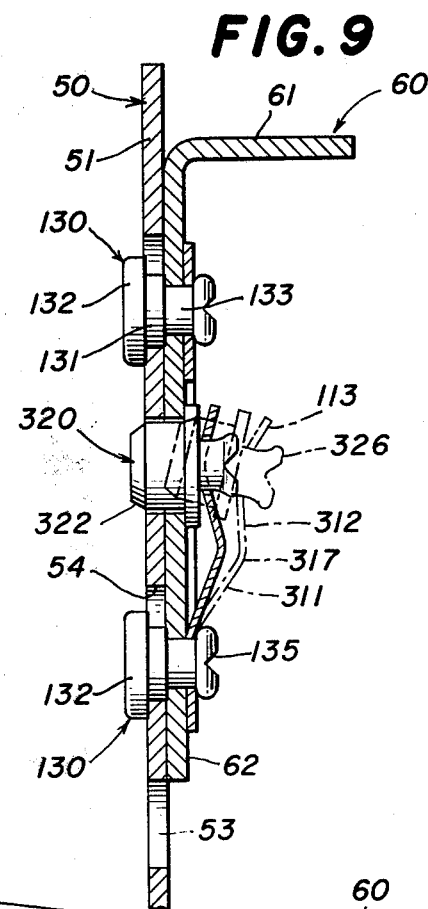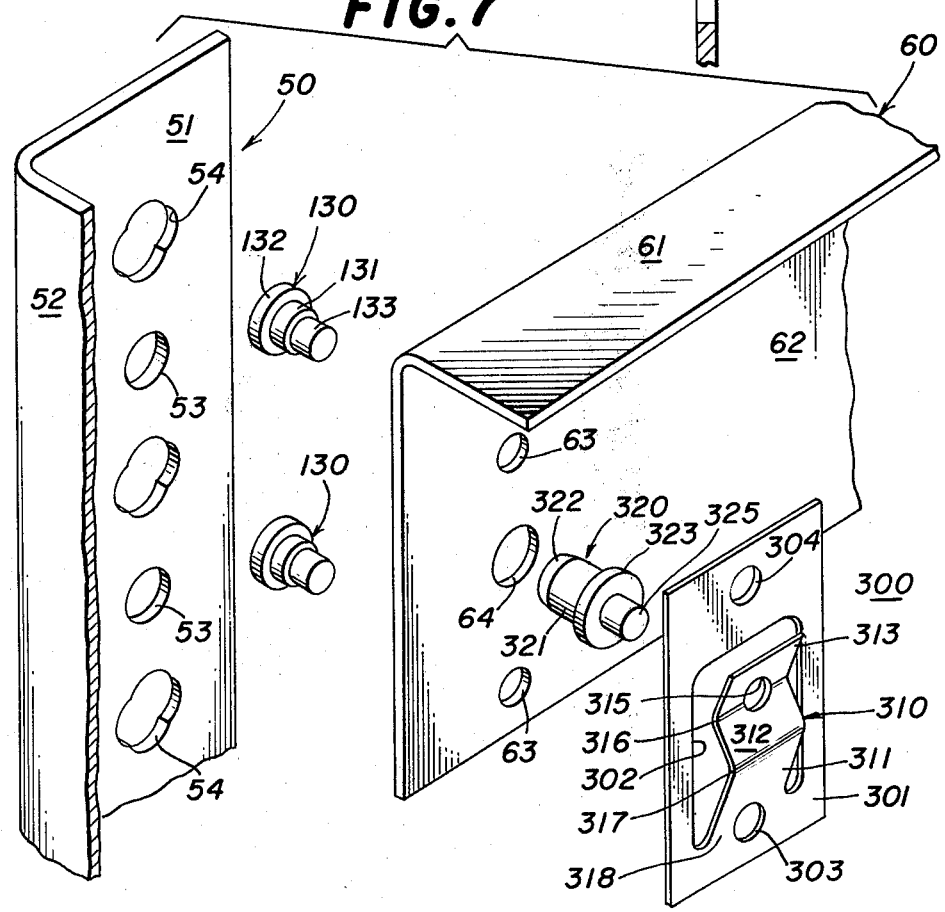

SNAP LOCK FOR QUICKLY-DETACHABLE BEAM-TO-POST JOINT

BACKGROUND OF THE INVENTION

Locking mechanism interconnecting upstanding post members and horizontal beam members have been provided such as those set forth in my U.S. Pat. No. 3,303,937, issued Feb. 14, 1967, and U.S. Pat. No. 3,392,848, issued to me and others on July 16, 1968. The prior art discloses a rigid connection between the lock pin and the base therefor, which rigid connection makes difficult fitting the lock pin into the apertures in the associated support members.

Other prior art structures utilized nuts and bolts for joining together horizontal and vertical members. The present invention avoids the use of nuts and bolts.

In yet other prior art devices, clover leaf shaped holes or "quadholes" were provided for receiving headed studs for interlocking horizontal and vertical members. In such prior structures, the headed studs have easily tilted out of engagement with the quadholes and do not provide a stable structure. As a result there could be an accidental lifting of a horizontal beam by a fork lift truck to cause disengagement with the associated vertical beam.

SUMMARY OF THE INVENTION

This invention relates to a snap lock for interconnecting associated post and beam members, and more particularly to a snap lock wherein the lock pin is loosely engaged to permit shifting movement of the lock pin relative to the base enabling ready fitting of the lock pin into aligned apertures in the associated support members.

More specifically, the present invention provides an improved structure for interconnecting post and beam members wherein quadholes and cooperating studs are used to interlock the members, no nuts and bolts being required. The present construction is such that the headed studs cannot tilt out of engagement with the quadholes, and therefore provide a very stable structure, the snap lock of the present invention being an essential part of the connection that serves to keep the headed studs forced against the small radius of the lowermost loop of the associated quadhole, thus preventing accidental lifting of a horizontal beam member from the associated vertical post member.

It is a general object of the present invention to provide a snap lock for interconnecting associated post and beam members wherein the load bearing end of the lock pin is shiftable for ready fitting into the aligned apertures in the associated members.

It is an important object of the present invention to provide a snap lock for interconnecting an upstanding post member and an associated horizontal beam member having aligned apertures therein, the snap lock comprising a resilient body having an opening therein, means for mounting the body on one of the associated members, a lock pin having a mounting stud extending outwardly through the opening and loosely fitting in the opening and trapped therein, a load bearing end carried by the mounting stud and constructed and arranged to pass through the aligned apertures in the associated members to interconnect the same, the body being resiliently deformable to permit the load bearing end to be withdrawn from the aligned apertures in the associated members, the resiliency of the body urging the load bearing end into the aligned apertures in the associated member and maintaining the load bearing end therein, the loose engagement between the body and the mounting stud providing shifting movement of the load bearing end to facilitate fitting of the load bearing end into the aligned apertures of the associated members.

Still another object of the present invention is to provide a snap lock of the type set forth wherein the adjacent surfaces of the lock pin and the body diverse outwardly to provide ready shifting movement therebetween.

Yet another object of the present invention is to provide a snap lock of the type set forth wherein the body has a flat base with spaced-apart mounting means carried thereby for mounting the base on one of the associated members, and a resilient arm having an opening therein and integral with the base and bent out of the plane thereof and extending therefrom beyond the adjacent edge.

A further object of the present invention is to provide a snap lock of the type set forth wherein the resilient arm has an opening therein and is integral with the base and bent out of the plane thereof and is positioned intermediate the mounting means.

A still further object of the present invention is to provide a snap lock for interconnecting an upstanding post member and an associated horizontal beam member having aligned apertures therein, the snap lock comprising a resilient body having an opening therein, a clip for removably mounting the body on one of the associated members, a lock pin having a mounting stud extending outwardly through the opening and loosely fitting in the opening and trapped therein, a load bearing end carried by the mounting stud and constructed and arranged to pass through the aligned apertures in the associated members to interconnect the same, the body being resiliently deformable to permit the load bearing end to be withdrawn from the aligned apertures in the associated members, the resiliency of the body urging the load bearing end into the aligned apertures in the associated member and maintaining the load bearing end therein, the loose engagement between the body and the mounting stud providing shifting movement of the load bearing end to facilitate fitting of the load bearing end into the aligned apertures of the associated members.

A final object of the present invention is to provide a snap lock of the type set forth wherein spaced-apart connecting lugs fixedly mount the body on the beam member and are constructed and arranged removably to mount the beam on the post member.

These and other objects of the present invention together with further objects and advantages thereof will best be understood by reference to the following specification when taken in connection with the accompanying drawings:

BRIEF DESCRIPTION OF THE DRAWINGS

FIG. 1 is a perspective view showing the snap lock of the present invention used in combination with an upstanding post member and a horizontal beam member;

FIG. 2 is an exploded perspective view of the snap lock of the present invention, particularly showing the mounting means therefor and the lock pin thereof;

FIG. 6 is an enlarged view showing another embodiment of the lock pin of the present invention;

FIG. 7 is an exploded perspective view of another embodiment of the present invention;

FIG. 8 is a rear elevational view of the parts shown in FIG. 7 in the assembled positions thereof;

FIG. 9 is an enlarged sectional view of the embodiment shown in FIG. 8 taken along lines 9—9 thereof;

DESCRIPTION OF THE PREFERRED EMBODIMENT

Figure 3:
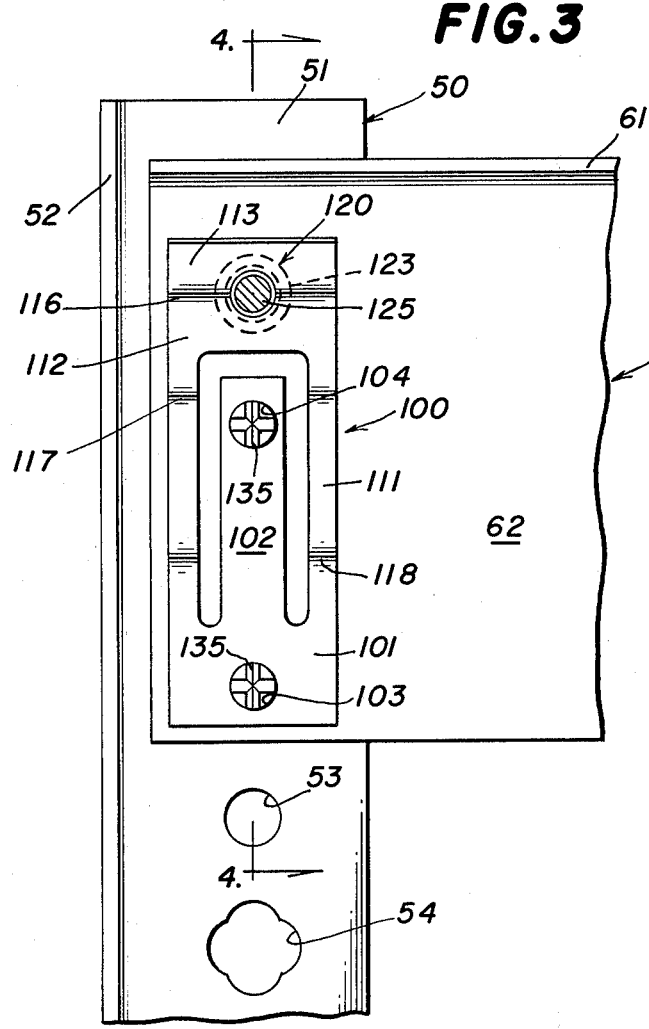
FIG. 3 is a rear elevational view of the assembled structure shown in FIG. 1.
Figure 4:
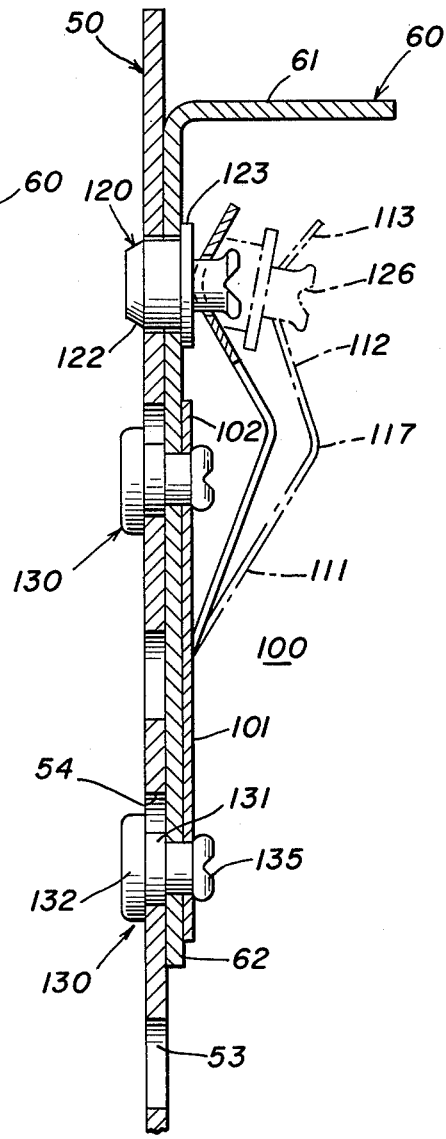
FIG. 4 is an enlarged sectional view of the assembled configuration shown in FIG. 3 taken along lines 4—4 thereof.
Figure 5:
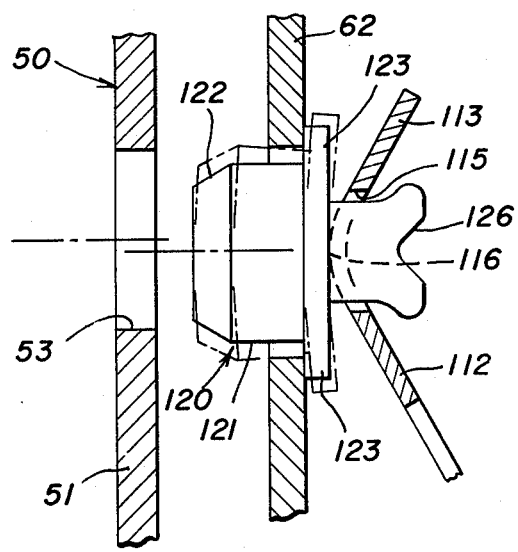
FIG. 5 is a further enlarged view showing the shifting movement of the lock pin with respect to the elongated body of the snap lock.

Referring now to the drawings, there is shown in FIGS. 1 to 5 thereof a snap lock 100 for use with an associated post member 50 and horizontal beam member 60. More particularly, the post member 50, which may be upstanding in use, is comprised of right angle flanges 51 and 52 each having a row of apertures therein alternating between cylindrical apertures 53 and cloverleaf apertures or "quadholes" 54. The associated beam member 60, which may be positioned horizontally in use, is comprised of right angled flanges 61 and 62 with spaced apart mounting apertures 63 in the flange 62. A locking aperture 64 having the same diameter as the apertures 53 in the associated post member 50 is positioned a predetermined distance from the mounting apertures 63.

In prior art structure for interconnecting members 50 and 60, the studs engaging in the quadholes 54 do not provide a firm connection, the studs in fact being in a "rocking chair" relation with respect to the lowermost quadrant of the quadhole.

In the present invention, the snap lock 100 firmly engages in associated apertures 64 and 53 to hold the associated headed studs in firm engagement with the lowermost quadrant of the associated quadhole 54. The snap lock 100 of the present invention in one preferred embodiment thereof includes a flat sheet metal base 101 having a mounting finger 102 extending outwardly therefrom, two mounting apertures 103 and 104 being provided, respectively, in the base 101 and the finger 102. A resilient arm 110 extends from the base 101 and is integral therewith, the arm 110 including spaced apart members 111 extending away from the base 101 and a generally U-shaped member 112 integral with the members 111 and extending therefrom toward the base and an end piece 113 integral with the member 112 and extending in the same direction as the members 111. An opening 115 is provided in the arm 110 and more particularly at the junction between the end piece 113 and the U-shaped member 112. The arm 110 is provided with a bend 116 interconnecting the end piece 113 and the U-shaped member 112 and a bend 117 interconnecting the members 111 with the U-shaped member 112 and a bend 118 interconnecting each of the members 111 with the associated part of the base 101. The base 101, finger 102 and arm 110 may also be made of a resilient plastic, and in fact, may be made of any resilient material providing the necessary action of the arm 110.

The snap lock 100 further includes a lock pin 120 having a load bearing end 121 terminating in a beveled end portion 122. An enlarged flange 123 serves to interconnect the load bearing end 121 with an outwardly extending mounting stud 125 shaped and constructed to extend through the opening 115 in the resilient arm 110 and to loosely fit therewithin. Once the mounting stud 125 has been positioned within the opening 115, the end thereof may be peened to provide an enlargement 126 thereby to trap the lock pin 120 in the arm 110. As seen, the diameter of the opening 115 is larger than the stud 125 to permit free tilting movement of the stud within the opening while restraining longitudinal shifting with respect to the arm 110. The lock pin 120 is preferably made of metal, but also may be made of a suitable plastic or the like.

Two headed studs or connecting lugs 130 are provided, each having a cylindrical body 131 carrying at one end thereof an enlarged head 132 and at the other end thereof an outwardly extending shank 133. The enlarged head 132 is constructed and arranged freely to pass through an associated one of the cloverleaf apertures 54 in the associated upstanding post 50 while the shank 133 is constructed to fit snugly through an associated one of the mounting apertures 63 in the associated beam 60 and through an associated one of the mounting apertures 103 and 104 in the base 101. The end of the shank 133 may be peened to provide an enlargement 135 when the associated beam 60 and base 101 have been assembled thereby fixedly to mount the base on the associated beam. The arm 110 is sufficiently resilient to allow deformation thereof to permit the lock pin 120 to be inserted between the opening 115 in the arm 110 and the associated locking aperture 64 in the beam.

The upstanding post 50 and the beam 60 may be interconnected by positioning the two connecting lugs 130 in registry with the associated ones of the cloverleaf apertures 54 in the upstanding post 50, and specifically seated upon the lowermost quadrant of the apertures 54. The heads 132 of each of the lugs 130 extend through the associated cloverleaf aperture 54 and the bodies 131 will rest therein thereby aligning the locking apertures 53 and 64 in the associated post 50 and beam 60, respectively. The arm 110 of the snap lock 100 is deformed until the beveled end 122 of the associated lock pin 120 comes in contact with the edge of the aperture 64 in the associated beam 60. The loose engagement between the arm 110 and the lock pin 120 provides for tilting movement of the lock pin with respect to the arm, and more particularly, the diverging surfaces of the bend 116 and the flat flange 123 facilitate tilting movement until the load bearing end 121 is in registry with the aligned apertures 53 and 64 to permit the urging of the resilient arm 110 forcefully to move the lock pin 120 into engagement with the apertures. The load bearing end 121 of the lock pin 120 is constructed and arranged to fit snugly in the apertures 53 and 64 of the upstanding post 50 and the beam 60, respectively, thereby to support and to interconnect the associated members, and specifically to seat and hold the bodies 131 of the lugs 130 in the lowermost quadrant of the associated apertures 54. The arm 110 of the snap lock 100 is resiliently deformable a sufficient amount to allow the lock pin 120 to be removed from the aligned apertures 53 and 64 while at the same time resilient enough continually to urge the lock pin 120 toward the associated post 50 and beam 60.

Referring now to FIG. 6 of the drawings, there is disclosed a second embodiment of the present invention wherein a resilient arm 210 has a flat portion 211 thereof with an opening 215 therein. A lock pin 220 is provided with a load bearing end 221 thereof terminating in a beveled end 222. An enlarged flange 223 has an arcuate surface from which extends a mounting stud 225. The mounting stud 225 is constructed and arranged loosely to fit within the opening 215 of the associated arm 210. The end of the stud 225 may be peened to provide an enlargement 226 which serves to trap the lock pin 220 in the associated resilient arm 210. The loose engagement of the mounting stud 225 with the opening 212 combined with the pivoting movement between the diverging surfaces of the flange 223 and the arm 210 provides the shifting movement necessary for the lock pin 220 to engage the associated aligned apertures 64 and 53 of the associated beam 60 and post 50, respectively. The principal difference between the embodiment 200 just described and the embodiment 100 of the present invention lies in the surface of the flange 223 diverging away from the arm 210 compared to the surface 116 diverging away from the flange 123 in the embodiment 100. Preferably, at least one of the adjacent surfaces of the arm and the lock pin should diverge away from the other to enhance the shifting and pivoting of the lock pin with respect to the resilient arm.

Referring now to FIGS. 7 through 9 of the drawings, there is shown another embodiment 300 of the present invention the snap lock 300 being shown in the same environment as the snap lock 100, whereby the same reference numerals have been applied to like parts of the environment; many parts of the snap lock 300 also are constructed like corresponding parts of the snap lock 100, whereby numbers in the 300 series corresponding to the numbers in the 100 series have been applied to those parts in the snap lock 300 that correspond to like parts in the snap lock 100. The snap lock 300 includes a flat base 301 having a central rectangular shaped aperture 302 therein. Mounting apertures 303 and 304 are spaced near the edges of the base 301 and are of the same diameter as the mounting apertures 63 in the associated beam 60. A resilient arm 310 is integral with the base 301 and is bent out of the plane thereof to provide a segment 311 extending away from the base which is integral with a segment 312 extending toward the base which is integral with a segment 313 extending away from the base. An opening 315 is provided intermediate the segments 312 and 313. Similar to the arm 110, the arm 310 is resilient and includes bends 316 and 317 provided intermediate the segments 313 and 312 and intermediate the segments 312 and 311, respectively. The arm 310 is also bendable at the juncture 318 between the arm and the base 301. The opening 315 like the opening 115 is located centrally of the bend 316 with the maximum point of curvature of the bend 316 passing through the center of the opening 315.

The lock pin 320 is provided with a load bearing end 321 having a beveled end 322. A flat planar flange 323 interconnects the load bearing end 321 with a mounting stud 325 which is constructed and arranged to fit loosely within the opening 315. The end of the mounting stud 325 may be peened to provide an enlargement 326 thereby to trap the lock pin 320 in the arm 310. The principal difference between the embodiment 300 and the embodiment 100 of the snap lock of the present invention lies in the effective length of the arm 310 which is substantially shorter than the arm 110. Additionally, the mounting apertures 303 and 304 are positioned so that the arm 310 is intermediate the apertures whereas the mounting apertures 103 and 104 are both on one side of the opening 115 in the arm 110 and the arm 110 extends beyond the adjacent edge of the base 101. The shorter effective length of the arm 310 enables the snap lock 300 to be used with beams 60 having a shorter flange 62 than possible with the snap lock 100.

Figure 11:
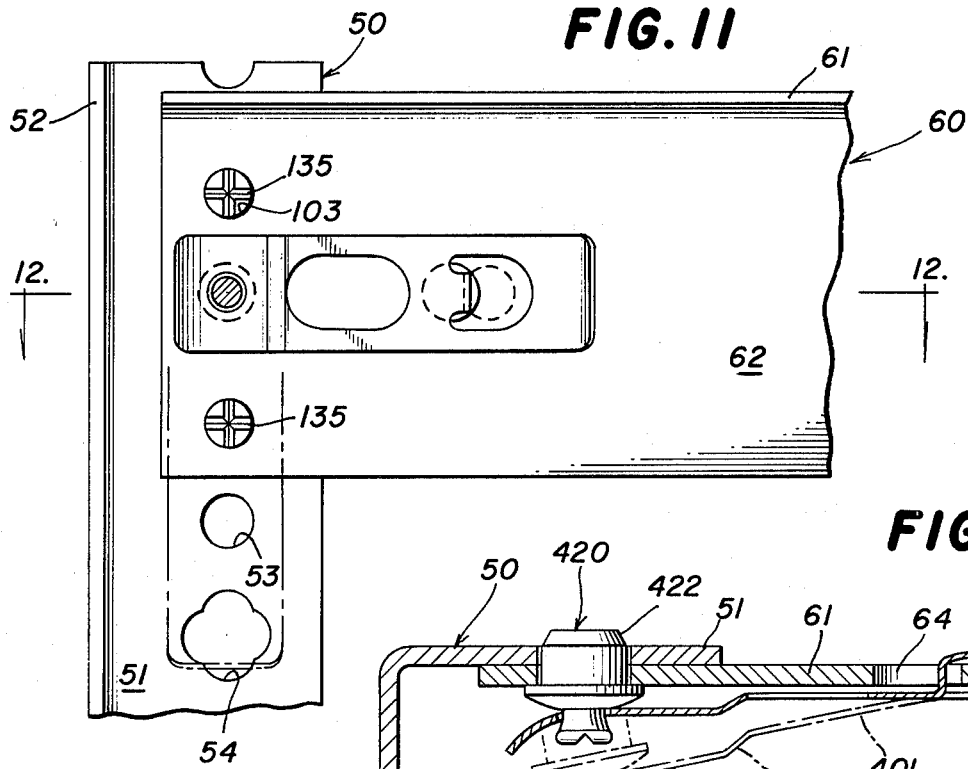
FIG. 11 is a rear elevational view of the assembled embodiment shown in FIG. 10.
Figure 12:
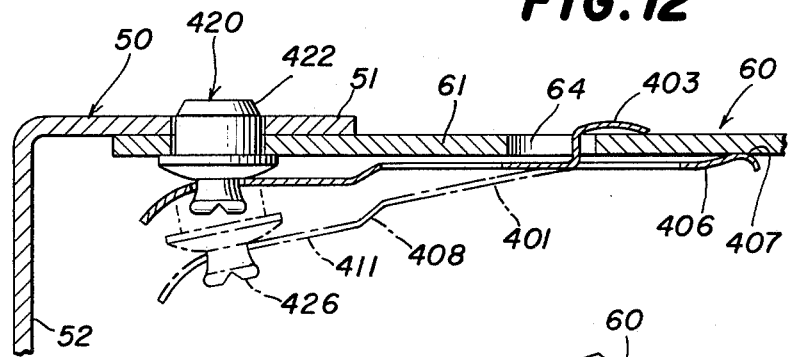
FIG. 12 is a sectional view of the embodiment shown in FIG. 11, taken along lines 12—12 thereof.
Figure 10:
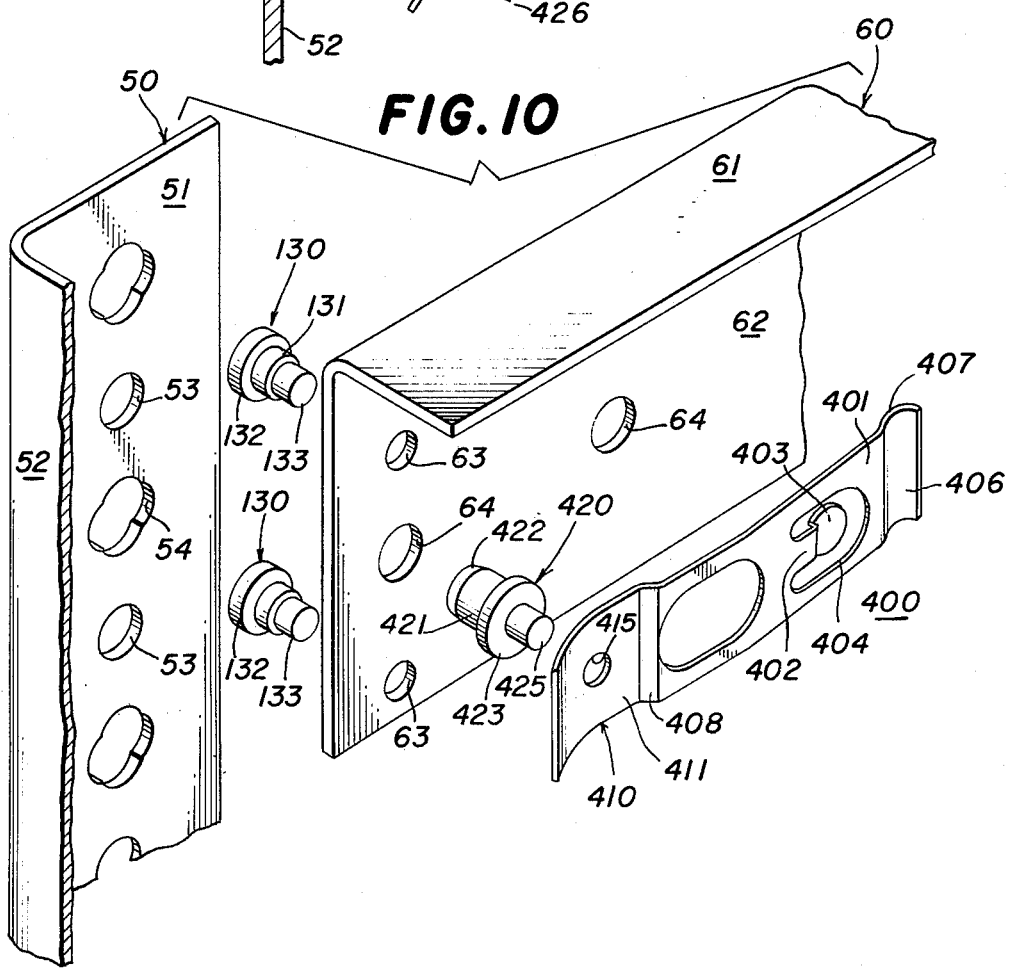
FIG. 10 is an exploded perspective view of a removable snap lock made in accordance with the present invention.

Referring now to FIGS. 10 to 12, there is disclosed yet another embodiment of the present invention, namely, a removable snap lock 400 which is shown in the same general environment as the snap lock 100, whereby the same reference numbers have been applied to those like parts of the environment; certain parts of the snap lock 400 also are constructed like corresponding parts of the snap lock 100, whereby numbers in the 400 series corresponding to the numbers in the 100 series have been applied to those parts in the snap lock 400 that correspond to like parts in the snap lock 100. More particularly, a removable snap lock 400 includes a resilient body 401 of spring metal or plastic having a mounting clip 402 with a tab 403 on the end thereof. The tab 403 is offset with respect to the clip 402 and lies in a central cut-out 404 in the body 401. The body 401 is formed at one end thereof into an arcuate member 406 having a bearing surface 407. At the other end of the body 401, an offset 408 is provided integral with the body 401 and with a resilient arm 410. The arm 410 includes an arcuate member 411 having an opening 415 therein. An associated lock pin 420 is provided with a load bearing end 421 having a beveled edge 422. An enlarged flange 423 is provided having an arcuate surface from which extends a mounting stud 425 constructed and arranged loosely to fit within the opening 415. The end of the mounting stud 425 may be peened to provide an enlargement 426 to trap the lock pin 420 in the arm 410. The snap lock 400 is effective to operate in substantially the same manner as the snap lock 100 except that the snap lock 400 is removable from the associated beam 60. The snap lock 400 is mounted onto the associated beam 60 by means of the tab 403 on the end of the clip 402 which is sized to fit through an associated one of the mounting apertures 64 in the beam 60. The resilience of the body 401 is such that the snap lock 400 is maintained in place by the cooperation of the tab 403 and the bearing surface 407 which serve firmly to hold the body 401 on the associated beam 60. The arm 410 is resilient and may be deformed an amount sufficient to remove the associated lock pin 420 from the aligned apertures 53 and 64 of the associated post 50 and beam 60 without dislodging the body 401 from the associated beam 60. Once the associated lock pin 420 is seated within the apertures 53 and 64, the snap lock 400 is effective to interconnect the associated post 50 and beam 60 by urging the bodies 131 of the lugs 130 firmly into the lowermost quadrant of the associated apertures 54. Upon removal of the lock pin 420 from the associated apertures 53 and 64, the snap lock 400 may be removed from the associated beam 60 by providing a force to separate the tab 403 from the bearing surface 407 and sliding the body 401 away from the aperture 64.

In each of the embodiments 100, 200, 300 and 400 of the snap lock of the present invention, the disclosed structure serves firmly to seat the associated headed studs 130 in the lowermost quadrant of the associated quadhole 54. Such a structure provides a firm connection between the associated post 50 and the beam 60, and more specifically, the headed studs 130 cannot be vertically dislodged from the associated quadholes 54 unless the associated lock pins 120, 220, 320 or 420 are first removed from the associated apertures 53. As a result it will not be possible inadvertently to disconnect the members 50 and 60 such as by striking the member 60 with a fork lift. In other words, the lock pins 120, 220, 320 and 420 firmly hold the radius of the body 131 of each of the headed studs 130 in contact with the radius of the lowermost quadrant of the associated aperture 54 at all times.

Although the lock pins 120, 220, 320 and 420 are closely engaged in the associated holes 53 and 64 so as firmly to hold the headed studs 130 in the associated quadholes 54 and specifically the lowermost quadrant thereof as explained above, all this is accomplished while still providing for easy and quick assembly of the parts. This is accomplished in great part by the loose tilting connection between the lock pins 120, 220, 320 and 420 and the associated resilient arm, and the relieved shoulders of the contacting parts so that the lock pins can be inserted into the apertures 64 and 53 which have only slightly greater diameters than that of the lock pin load bearing end. More specifically, each of the embodiments 100, 200, 300 and 400 of the snap lock of the present invention have in common the shifting movement illustrated in FIG. 5 of the drawings, wherein the mounting stud of the lock pin is free to move within the opening in the resilient arm. Further, the diverging adjacent surfaces of the lock pin and the arm cooperate with the relationship between the mounting stud and the opening to provide the shifting movement necessary to readily fit the lock pin into the aligned apertures of the associated post and beam members.

While there has been described what are at present considered to be certain preferred embodiments of the present invention, it will be understood that various modifications and alterations may be made herein without departing from the true spirit and scope of the present invention, and it is intended to cover in the appended claims all such modifications and alterations as fall within the true spirit and scope of the present invention.

What is claimed is:

1. A snap lock for interconnecting an upstanding post member and an associated horizontal beam member having aligned apertures therein, said snap lock comprising a resilient body having an opening therein, means for mounting said body on one of the associated members, a lock pin having a mounting stud extending outwardly through said opening and trapped therein, a load bearing end carried by said mounting stud and constructed and arranged to pass through the aligned apertures in the associated members to interconnect the same, said mounting stud having a cross section slightly less than that of the associated opening for loosely fitting and tilting in said opening while being restrained from longitudinal shifting with respect to said body, the adjacent surfaces of said lock pin and said body diverging outwardly to provide for ready tilting movement therebetween, said body being resiliently deformable to permit said load bearing end to be withdrawn from the aligned apertures in the associated members, the resiliency of said body adapted to urge said load bearing end into the aligned apertures in the associated member and maintain said load bearing end therein, the loose engagement between said body and said mounting stud providing tilting movement of said load bearing end to facilitate fitting of said load bearing end into the aligned apertures of the associated members.

2. The snap lock set forth in claim 1, wherein the surface of said body adjacent to said lock pin diverges from said lock pin to provide for ready tilting movement between said body and said lock pin.

3. The snap lock set forth in claim 1, wherein the surface of said lock pin adjacent to said body diverges from said body to provide for ready tilting movement between said body and said lock pin.

4. The snap lock set forth in claim 1, wherein said mounting stud has an enlargement on the end thereof to trap said mounting stud in said opening.

5. The snap lock set forth in claim 1, wherein said load bearing end of said lock pin is beveled to facilitate fitting of said load bearing end into the aligned apertures of the associated members.

6. The snap lock set forth in claim 1, wherein said resilient body is formed of resilient sheet metal.

7. The snap lock set forth in claim 1, wherein said resilient body is formed of a resilient plastic.

8. A snap lock for interconnecting an upstanding post member and an associated horizontal beam member having aligned apertures therein, said snap lock comprising a body having a flat base with spaced apart mounting means carried thereby for mounting said base on one of the associated members, a resilient arm having an opening therein and being integral with said base and extending out of the plane thereof and extending therefrom beyond the adjacent edge thereof, a lock pin having a mounting stud extending outwardly through said opening and having a cross section slightly less than that of the associated opening for loosely fitting and tilting in said opening and trapped therein while being restrained from longitudinal shifting with respect to said arm, a load bearing end carried by said mounting stud and constructed and arranged to pass through the aligned apertures in the associated members to interconnect the same, said arm being resiliently deformable to permit said load bearing end to be withdrawn from the aligned apertures in the associated members, the resiliency of said arm adapted to urge said load bearing end into the aligned apertures in the associated member and maintaining said load bearing end therein, the loose engagement between said arm and said mounting stud providing tilting movement of said load bearing end to facilitate fitting of said load bearing end into the aligned apertures of the associated members.

9. The snap lock set forth in claim 8, wherein said arm is bent out of the plane of said base to form a first section extending away from the associated member and then is bent toward the associated member to form 10. A snap lock for interconnecting an upstanding post member and an associated horizontal beam member having aligned apertures therein, said snap lock comprising a body having a flat base with spaced apart mounting means carried thereby for mounting said base on one of the associated members, a resilient arm having an opening therein and being integral with said base and bent out of the plane thereof and being positioned intermediate said mounting means, a lock pin having a mounting stud extending outwardly through said opening and having a cross section slightly less than that of the associated opening for loosely fitting and tilting in said opening and trapped therein while being restrained from longitudinal shifting with respect to said arm, a load bearing end carried by said mounting stud and constructed and arranged to pass through the aligned apertures in the associated members to interconnect the same, said arm being resiliently deformable to permit said load bearing end to be withdrawn from the aligned apertures in the associated members, the resiliency of said arm adapted to urge said load bearing end into the aligned apertures in the associated member and maintain said load bearing end therein, the loose engagement between said arm and said mounting stud providing tilting movement of said load bearing end to facilitate fitting of said load bearing end into the aligned apertures of the associated members.

11. The snap lock set forth in claim 10, wherein said arm extends out of the plane of said base to provide a first section extending away from the associated member and then extends toward the associated member to provide a second section and then extends away from the associated member to form a third section, said opening being positioned at the juncture between said second section and said third section.

12. A snap lock for interconnecting an upstanding post member and an associated horizontal beam member having aligned apertures therein, said snap lock comprising a resilient body having an opening therein, a clip for removably mounting said body on one of the associated members, a lock pin having a mounting stud extending outwardly through said opening and loosely fitting in said opening and trapped therein, a load bearing end carried by said mounting stud and constructed and arranged to pass through the aligned apertures in the associated members to interconnect the same, said mounting stud having a cross section slightly less than that of the associated opening and loosely fitting and tilting in said opening while being restrained from longitudinal shifting with respect to said body, the adjacent surfaces of said lock pin and said body diverging outwardly to provide for ready tilting movement therebetween, said body being resiliently deformable to permit said load bearing end to be withdrawn from the aligned apertures in the associated members, the resiliency off said body adapted to urge said load bearing end into the aligned apertures in the associated member and maintain said load bearing end therein, the loose engagement between said body and said mounting stud providing tilting movement of said load bearing end to facilitate fitting of said load bearing end into the aligned apertures of the associated members.

13. The snap lock set forth in claim 12, wherein said clip and said body are integral.

14. A snap lock and a horizontal beam member for interconnecting with an associated upstanding post member said members having aligned apertures therein, said snap lock comprising a resilient body having an opening therein, spaced-apart connector lugs extending through said beam member and said body for fixedly mounting said body to said beam member, said connecting lugs being constructed and arranged removably to mount said beam member and said body fixedly mounted thereon on the post member, a lock pin having a mounting stud extending outwardly through said opening and loosely fitting in said opening and trapped therein, a load bearing end carried by said mounting stud and constructed and arranged to pass through the aligned apertures in said beam member and the post member to interconnect the same, said mounting stud having a cross section slightly less than that of the associated opening and loosely fitting and tilting in said opening while being restrained from longitudinal shifting with respect to said body, the adjacent surfaces of said lock pin and said body diverging outwardly to provide for ready tilting movement therebetween, said body being resiliently deformable to permit said load bearing end to be withdrawn from the aligned apertures in the associated members, the resiliency of said body adapted to urge said load bearing end into the aligned apertures in the associated members and maintain said load bearing end therein, the loose engagement between said body and said mounting stud providing tilting movement of said load bearing end to facilitate fitting of said load bearing end into the aligned apertures of the associated members.

15. A snap lock for interconnecting an upstanding post member and an associate horizontal beam member having aligned apertures therein, said snap lock comprising a resilient body having a first bearing surface adjacent to one end thereof and a second bearing surface spaced from the other end thereof and an opening therein between said second bearing surface and said other end thereof, a tab struck from said body and extending therefrom in the same direction as said bearing surfaces and being spaced from said body a distance to receive the thickness of one of the associated members therebetween, said body and said bearing surfaces and said tab being shaped and arranged so that said tab is resiliently urged against one side of the associated member, a lock pin having a mounting stud extending outwardly through said opening and loosely fitting in said opening and trapped therein, a load bearing end carried by said mounting stud and constructed and arranged to pass through the aligned apertures in the associated members to interconnect the same, said mounting stud having a cross section slightly less than that of the associated opening for loosely fitting and tilting in said opening and while being restrained from longitudinal shifting with respect to said body, the adjacent surfaces of said lock pin and said body diverging outwardly to provide for ready tilting movement therebetween, said body being resiliently deformable to permit said load bearing end to be withdrawn from the aligned apertures in the associated members, the resiliency of said body adapted to urge said load bearing end into the aligned apertures in the associated members and maintain said load bearing end therein, the loose engagement between said body and said mounting stud providing tilting movement of said load bearing end to facilitate fitting of said load bearing end into the aligned apertures of the associated members.

* * * * *